US008169653B2

(12) United States Patent
Grabiec et al.

(10) Patent No.: US 8,169,653 B2
(45) Date of Patent: May 1, 2012

(54) CONFIGURING GAMING VOUCHER LAYOUTS IN GAMING MACHINES

(75) Inventors: Jacek A Grabiec, Chicago, IL (US); Craig J. Sylla, Round Lake, IL (US)

(73) Assignee: WMS Gaming Inc., Waukegan, IL (US)

( * ) Notice: Subject to any disclaimer, the term of this patent is extended or adjusted under 35 U.S.C. 154(b) by 1072 days.

(21) Appl. No.: 11/997,572

(22) PCT Filed: Aug. 21, 2006

(86) PCT No.: PCT/US2006/032528

§ 371 (c)(1),
(2), (4) Date: Feb. 1, 2008

(87) PCT Pub. No.: WO2007/024758

PCT Pub. Date: Mar. 1, 2007

(65) Prior Publication Data

US 2008/0213026 A1 Sep. 4, 2008

Related U.S. Application Data

(60) Provisional application No. 60/710,184, filed on Aug. 22, 2005.

(51) Int. Cl.
*G06F 15/00* (2006.01)
*G06F 19/00* (2011.01)

(52) U.S. Cl. ........................................ 358/1.18; 463/25

(58) Field of Classification Search ................. 358/1.18, 358/1.16, 1.15, 1.14, 1.13; 400/12.01, 462; 463/25, 31, 29
See application file for complete search history.

(56) References Cited

U.S. PATENT DOCUMENTS

| | | | | |
|---|---|---|---|---|
| 6,110,044 | A | 8/2000 | Stern | |
| 2002/0128059 | A1 | 9/2002 | Baltz et al. | |
| 2004/0033095 | A1* | 2/2004 | Saffari et al. | 400/120.01 |
| 2007/0117608 | A1* | 5/2007 | Roper et al. | 463/16 |

OTHER PUBLICATIONS

"Tickets, Forms, Certificates, Coupons, and Label Software", *Elk River Systems Inc.* (www.elkriversystems.com), (Feb. 12, 2005),6 pgs.
"International Search Report for Application No. PCT/US2006/32528, date mailed Jan. 25, 2007", 4 pgs.
"Written Opinion of the International Searching Authority for Application No. PCT/US2006/32528, date mailed Jan. 25, 2007", 6 pgs.

* cited by examiner

*Primary Examiner* — Saeid Ebrahimi Dehkordy
(74) *Attorney, Agent, or Firm* — Schwegman, Lundberg & Woessner, P.A.

(57) ABSTRACT

Systems and methods for configuring gaming voucher layouts are described herein. In one embodiment the method includes receiving, in a gaming machine, a gaming voucher layout defining a print layout for a gaming voucher. The method can also include loading the gaming voucher layout into a printer, where the printer is part of the gaming machine.

20 Claims, 9 Drawing Sheets

CONFIGURING GAMING VOUCHER LAYOUTS IN GAMING MACHINES

RELATED APPLICATIONS

This application is a U.S. National Stage Filing under 35 U.S.C. 371 from International Patent Application Serial No. PCT/US2006/032528, filed Aug. 21, 2006, and published on Mar. 1, 2007 as WO 2007/024758 A1, which claims the priority benefit of U.S. Provisional Application Ser. No. 60/710,184, filed Aug. 22, 2005, the contents of which are incorporated herein by reference.

COPYRIGHT

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever. Copyright 2006, WMS Gaming, Inc.

FIELD

This invention relates generally to the field of gaming machines and more particularly to the field of gaming vouchers.

BACKGROUND

Gaming machine manufacturers and casinos have recently introduced cashless gaming machines. Cashless gaming machines typically award gaming vouchers instead of money, where players can redeem the vouchers for cash or use them to transfer credits to other gaming machines. For example, when a player "cashes-out" on a cashless gaming machine, the gaming machine presents the player with a gaming voucher. The player can then redeem the voucher for cash at a cashier's cage or insert the voucher into another gaming machine which will accept the credits for use in other wagering games.

In addition to serving as a means for monetary and gaming credit exchange, gaming vouchers can also include advertisements, coupons, promotions, etc. For example, a casino may set-up their gaming vouchers to include food coupons redeemable in the casino's restaurant. When gaming machine operators change their vouchers (e.g., by adding coupons), they typically change their gaming voucher print layouts, which define how the vouchers will look when printed. Traditionally, gaming machine operators change gaming voucher print layouts by redrafting program code in the gaming machine and/or in gaming voucher printers.

BRIEF DESCRIPTION OF THE FIGURES

The present invention is illustrated by way of example and not limitation in the Figures of the accompanying drawings in which.

OVERVIEW OF SOME EMBODIMENTS

Figure 1:
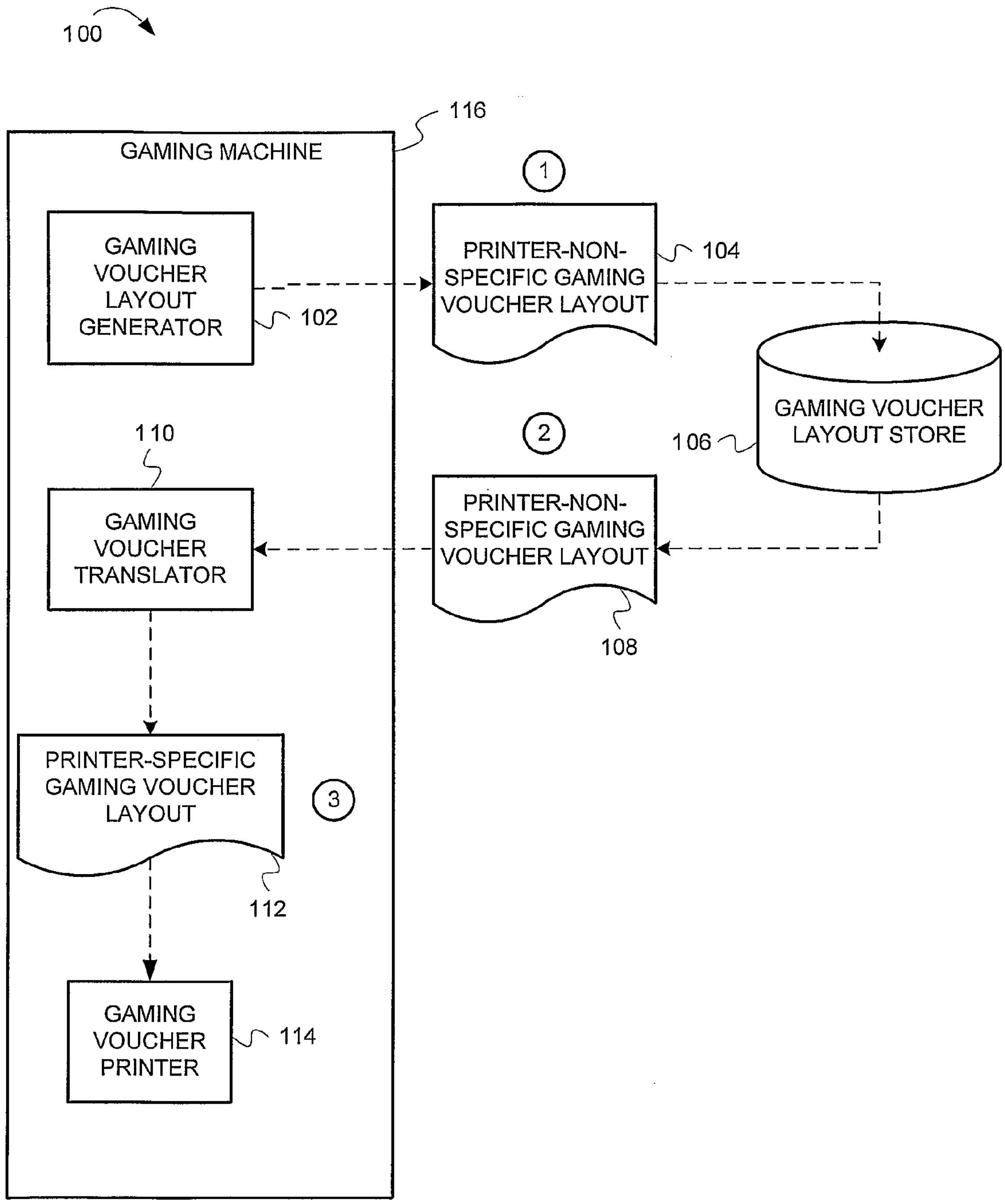
FIG. 1 is a dataflow diagram illustrating dataflow attendant to configuring a gaming voucher layout in a gaming machine, according to embodiments of the invention.

Systems and methods for configuring gaming voucher layouts are described herein. In one embodiment a method includes receiving, in a gaming machine, a gaming voucher layout defining a print layout for a gaming voucher. The method can also include loading the gaming voucher layout into a printer, where the printer is part of the gaming machine. In one embodiment, the method can further include, before loading the gaming voucher layout into the printer, translating the gaming voucher layout into a page description language understandable by the printer. In one embodiment, the gaming voucher layout includes a font, font size, ink color, or data field. In one embodiment, the method can further include printing a gaming voucher according to the gaming voucher layout. In one embodiment, the print layout is of a jackpot voucher, cash-out voucher, jackpot receipt, or inventory receipt. In one embodiment, the creating includes receiving a set of user-selected elements and element attributes through a graphical design interface.

In one embodiment, a method can include presenting a gaming voucher layout design interface, receiving, through the gaming voucher layout design interface, gaming voucher information specifying a print layout for a gaming voucher, and creating, based at least in part on the gaming voucher information, a gaming voucher layout. In one embodiment, the method can further include restricting, in the gaming voucher layout design interface, certain gaming voucher layout elements and attributes, the restricting based at least in part on laws of a regulatory jurisdiction. In one embodiment, the method can further include requiring, in the gaming voucher layout design interface, certain gaming voucher layout elements and attributes, the requiring based at least in part on laws of a regulatory jurisdiction. In one embodiment, the method can further include translating the gaming voucher layout into a format understandable by a gaming voucher printer, wherein the gaming voucher printer is part of the gaming machine and loading the gaming voucher layout onto the gaming voucher printer. In one embodiment the presenting includes determining a jurisdiction in which the gaming voucher layout can be used and, based at least in part on the jurisdiction, presenting gaming voucher layout options that are permissible in the jurisdiction. In one embodiment the method can further include determining that the gaming voucher layout conforms to laws of a designated regulatory jurisdiction. In one embodiment, the gaming voucher layout is in a printer-non-specific format. In one embodiment, the gaming voucher layout is in a page description language understandable to a gaming voucher printer. In one embodiment, the gaming voucher layout design interface provides drag and drop elements for designing the gaming voucher layout.

In one embodiment, a method can include receiving a first gaming voucher layout, selecting a gaming voucher layout format compatible with a gaming voucher printer of a gaming machine, translating, based on the gaming voucher layout format, the first gaming voucher layout into a second gaming voucher layout, and loading the second gaming voucher layout onto the gaming voucher printer. In one embodiment, the method can be performed during boot-up. In one embodiment, the gaming voucher layout is received from a database on a gaming network. In one embodiment, the second gaming voucher layout is represented in a page description language compatible with the gaming voucher printer. In one embodiment, the first gaming voucher layout is represented in a page description language that is not compatible with the gaming voucher printer.

DESCRIPTION OF THE EMBODIMENTS

Systems and methods for configuring gaming voucher layouts are described herein. This description of the embodiments is divided into five sections. The first section provides an introduction to embodiments of the invention. The second section describes example gaming device architectures, while the third section describes example operations performed by some embodiments of the gaming device architectures. The fourth section describes embodiments of a gaming machine and the fifth section provides some general comments.

Introduction

This section introduces embodiments which enable gaming machine operators to configure gaming voucher layouts on gaming machines on a casino floor. Gaming voucher layouts define how gaming vouchers will appear when they are printed. For example, gaming voucher layouts can define what fonts, font sizes, ink colors, and data fields will appear on printed gaming vouchers. FIG. 1 describes how embodiments configure gaming voucher layouts on a gaming machine.

FIG. 1 is a dataflow diagram illustrating dataflow attendant to configuring a gaming voucher layout in a gaming machine, according to embodiments of the invention. FIG. 1 shows a gaming voucher layout configuration system 100 including a gaming machine 116 and a gaming voucher layout store 106. The gaming machine 116 includes a gaming voucher layout generator 102, gaming voucher translator 110, and a gaming voucher printer 114. The gaming voucher layout generator 102 can include a graphical design interface, which allows operators to graphically design gaming voucher layouts by dragging icons and/or selecting options in a layout design wizard. In some embodiments, the gaming voucher layout store 106 is part of the gaming machine 116, while the gaming voucher layout generator 102 and gaming voucher translator 110 are part of one or more remotely accessible network devices.

The data flow in FIG. 1 occurs in three stages. At stage 1, the gaming voucher layout generator 102 generates a printer-non-specific gaming voucher layout 104 based on selections and images created in a graphical design interface. Also during stage one, the gaming voucher layout generator 102 stores the printer-non-specific gaming voucher layout in the gaming voucher layout store 106.

At stage two, the gaming voucher translator 110 receives the printer-non-specific gaming voucher layout 108 and translates it into a printer-specific gaming voucher layout 112. At stage three, the gaming voucher translator 110 loads the printer-specific gaming voucher layout onto the gaming voucher printer 114. Once the gaming voucher printer 114 receives the printer-specific gaming voucher layout 112, the gaming voucher printer 114 can print gaming vouchers according to the layout.

These and other features will be described in more detail below. The next section describes an example system architecture and operating environment.

Example System Architecture and Operating Environment

This section describes an example system architecture and operating environment with which embodiments can be practiced. In particular, FIG. 2 describes an example gaming machine, whereas FIG. 3 describes an example gaming network and FIG. 4 describes an example gaming voucher. The discussion continues with FIG. 2.

Figure 2:
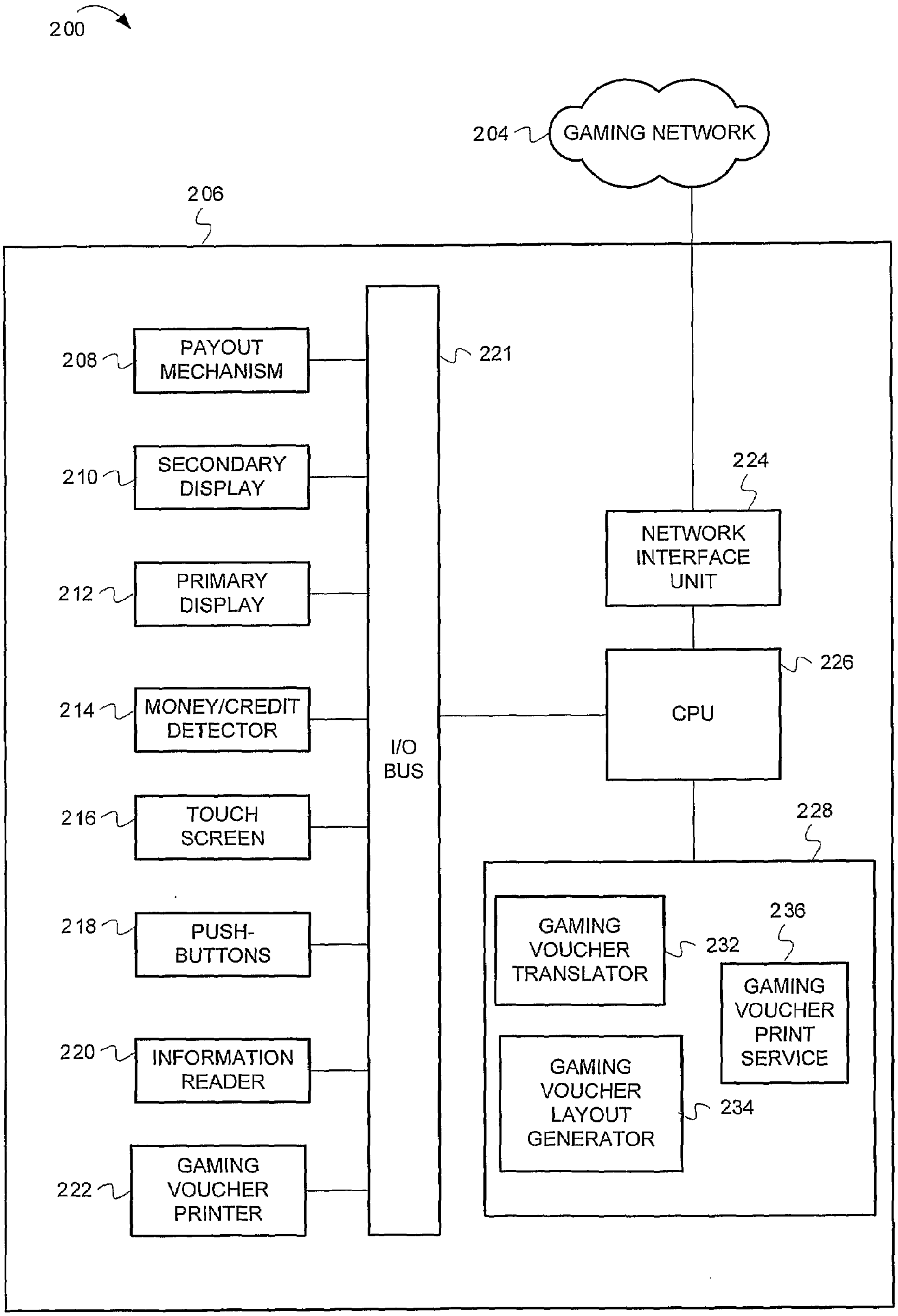
FIG. 2 is a block diagram illustrating components of a gaming machine, used in conjunction with example embodiments of the invention.

FIG. 2 is a block diagram illustrating components of a gaming machine, used in conjunction with example embodiments of the invention. As shown in FIG. 2, the gaming machine 206 includes a central processing unit (CPU) 226 connected to a memory unit 228. The memory unit 228 includes a gaming voucher translator 232, gaming voucher layout generator 234, and gaming voucher print service 236. According to embodiments, the memory unit 228 includes a tangible machine-readable media including instructions for conducting casino-style wagering games (including bonus events), such as video poker, video blackjack, video slots, etc.

The CPU 226 is connected to a network interface unit 224, which is connected to a gaming network 204. The CPU 226 is also connected to an input/output (I/O) bus 221 which facilitates communication between the system components and the CPU 226. The I/O bus 221 is connected to a gaming voucher printer 222, which can print gaming vouchers based on gaming voucher layouts created on the gaming machine 206.

The I/O bus 221 is also connected to payout mechanism 208, secondary display 210, primary display 212, money/credit detector 214, touchscreen 216, push-buttons 218, information reader 220.

According to some embodiments, the gaming machine 206 can include additional peripheral devices and/or more than one of each component shown in FIG. 2. For example, in one embodiment, the gaming machine 206 can include multiple network interface units 224 and multiple CPUs 226. Additionally, the components of the gaming machine 206 can be interconnected according to any suitable interconnection architecture (e.g., directly connected, hypercube, etc.). Gaming machines are described in more detail below, in the discussion of FIG. 9.

According to some embodiments, a plurality of gaming machines can be connected together in a gaming network. The gaming network can include gaming machines and other gaming devices, such as gaming configuration servers, accounting servers, wide area progressive servers, etc. This discussion of FIG. 3 describes gaming networks in more detail.

Figure 3:
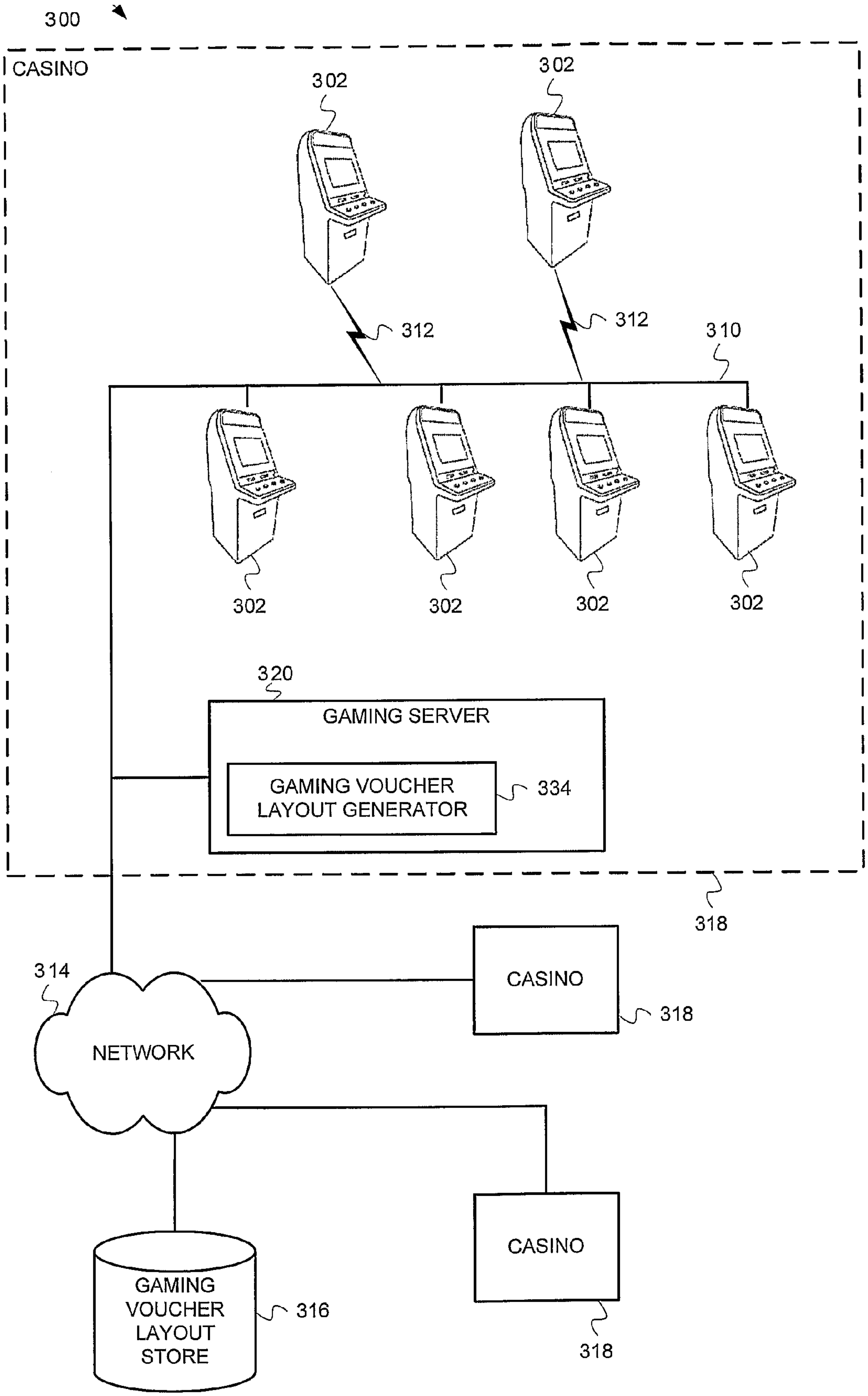
FIG. 3 is a block diagram illustrating a gaming network, according to example embodiments of the invention.

FIG. 3 is a block diagram illustrating a gaming network, according to example embodiments of the invention. In some embodiments, the gaming machines described above can be part of a wagering game network 300.

As shown in FIG. 3, the wagering game network 300 includes a gaming voucher layout store 316 connected to a communications network 314. The wagering game network 300 also includes a plurality of casinos 318 connected to the communications network 314. Each of the plurality of casinos 318 include local area networks, which include a plurality of gaming machines 302 connected to a gaming server 320. The gaming server 320 can include gaming configuration servers, accounting servers, wide area progressive servers, etc. In one embodiment, the gaming server 320 includes a gaming voucher layout generator 334 and/or a gaming voucher layout translator (not shown) for creating and installing gaming voucher layouts at a casino.

The components of each casino 318 can communicate over wired 310 and/or wireless connections 312. Furthermore, they can employ any suitable connection technology, such as Bluetooth, 802.11, Wireless Application Protocol (WAP), Ethernet, public switched telephone networks, etc. Operations performed by the gaming machines and other components of the gaming network are described in the next section.

Figure 4:
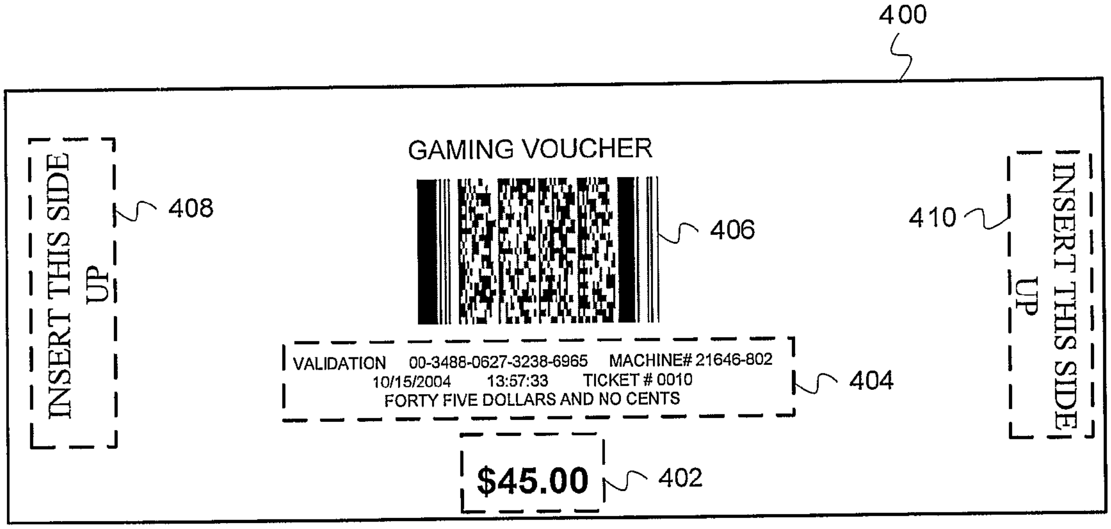
FIG. 4 is a block diagram illustrating a gaming voucher, according to example embodiments of invention.

In some embodiments, gaming machines or other network components can enable operators to create/modify gaming voucher print layouts. FIG. 4 describes gaming vouchers and print layouts in greater detail.

FIG. 4 is a block diagram illustrating a gaming voucher, according to example embodiments of invention. FIG. 4 shows a gaming voucher 400 including several elements and element attributes. The gaming voucher 400 includes a monetary value element 402, validation information element 404, bar-code element 406, and message elements 408 and 410. Each of the elements can have different attributes, such as font style, font size, ink color, location, background color, or other suitable attribute. For example, the monetary value element 402 has the following element attributes: Font Style=Arial, Font Size=10 pt, Ink Color=Black, All Caps=Off, Location=(20, 1).

In one embodiment, a combination of elements and element attributes defines a gaming voucher's a layout. Gaming voucher layouts can include jackpot voucher layouts, cash-out voucher layouts, jackpot receipt layouts, inventory receipt layouts, or other suitable layouts. Gaming voucher layouts describe how gaming vouchers will appear when printed. Gaming voucher layouts and tools for creating them are described in greater detail in the next section.

Example Operations

This section describes operations performed by embodiments of the invention. In the discussion below, the flow diagrams will be described with reference to the block diagrams presented above. In certain embodiments, the operations are performed by instructions residing on machine-readable media (e.g., software), while in other embodiments, the operations are performed by hardware and/or other logic (e.g., digital logic).

Figure 5:
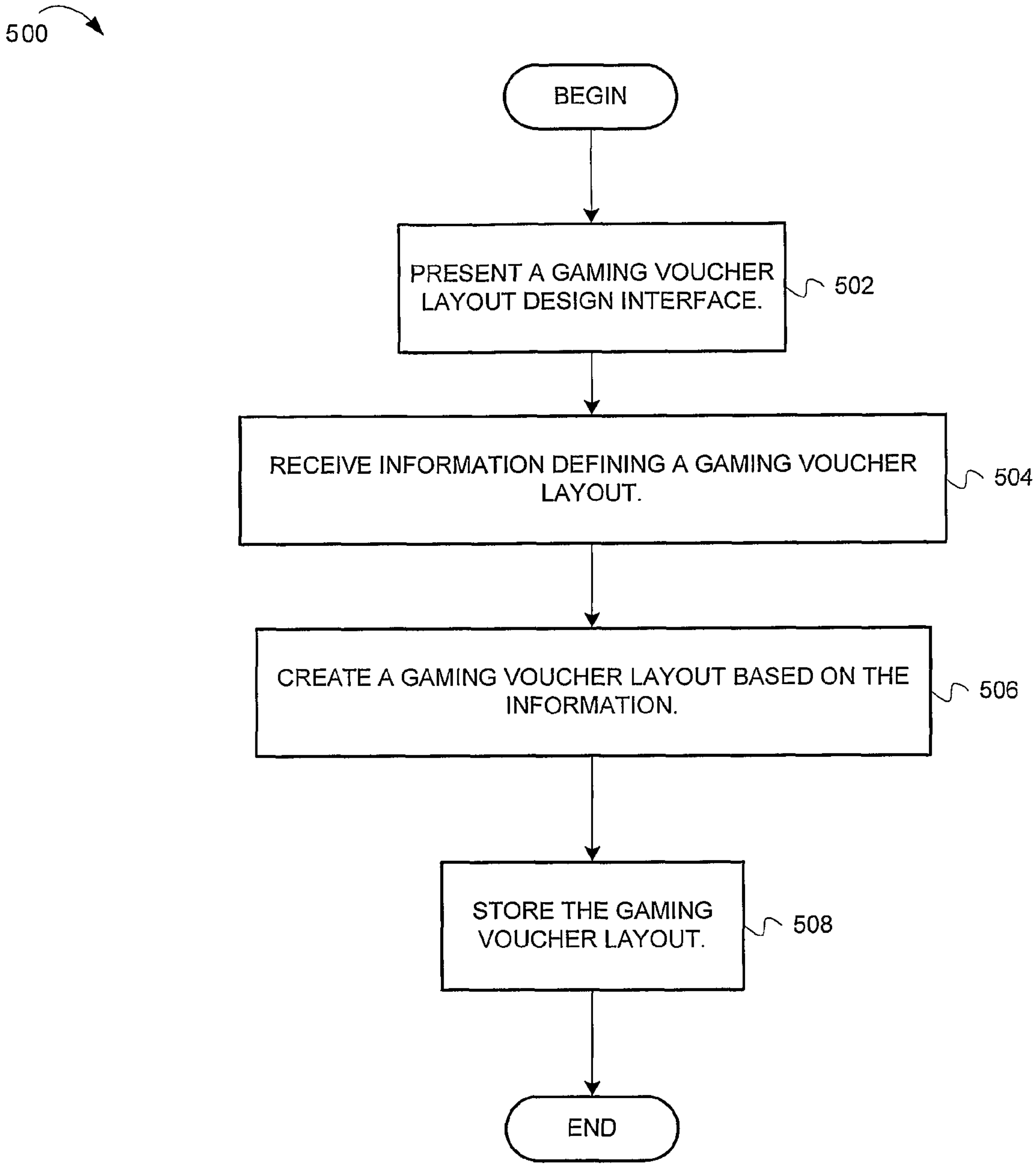
FIG. 5 is a flow diagram illustrating operations for creating a gaming voucher layout, according to example embodiments of the invention.
Figure 6:
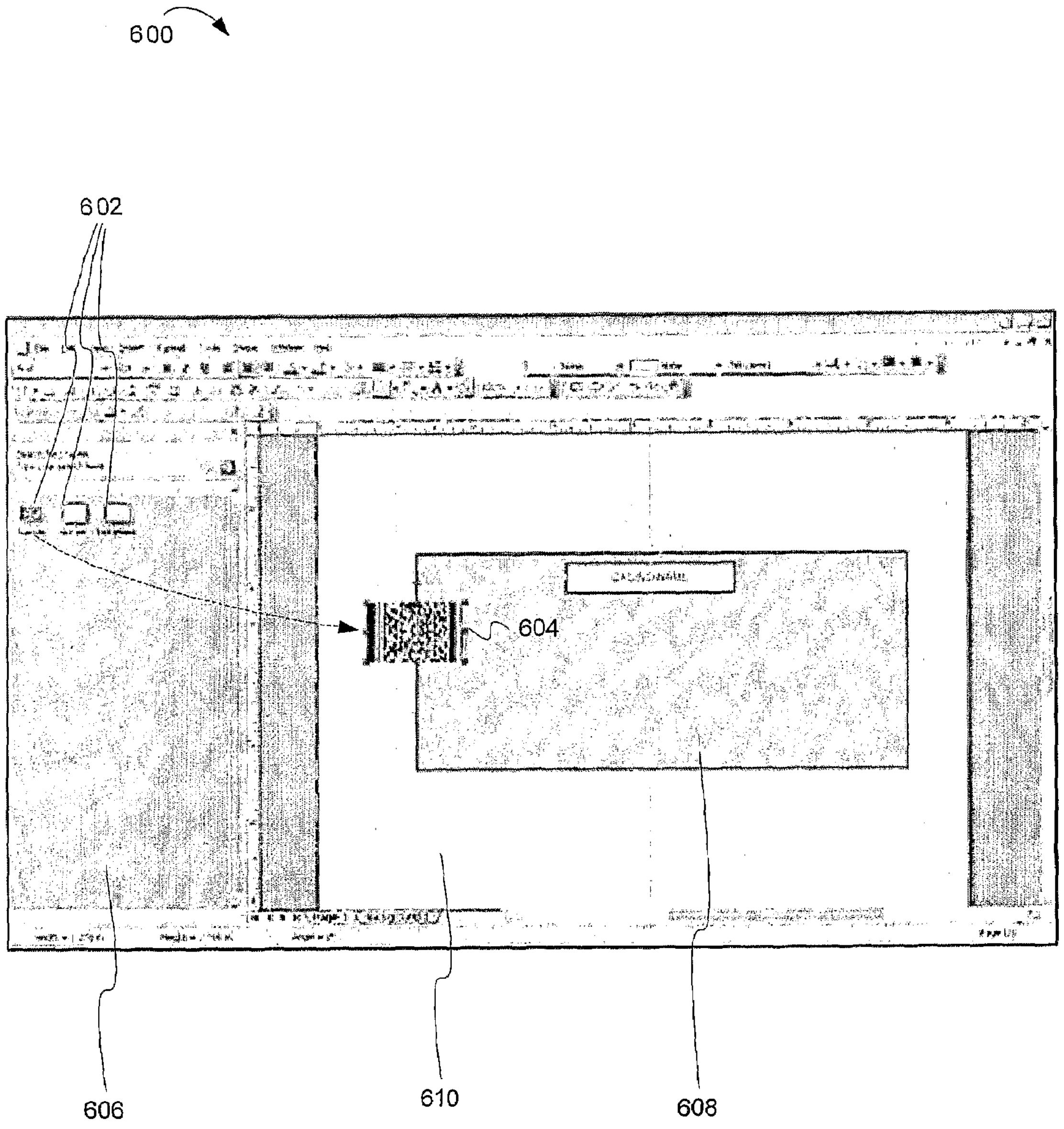
FIG. 6 is a block diagram illustrating a gaming voucher layout design interface, according to example embodiments of the invention.
Figure 7:
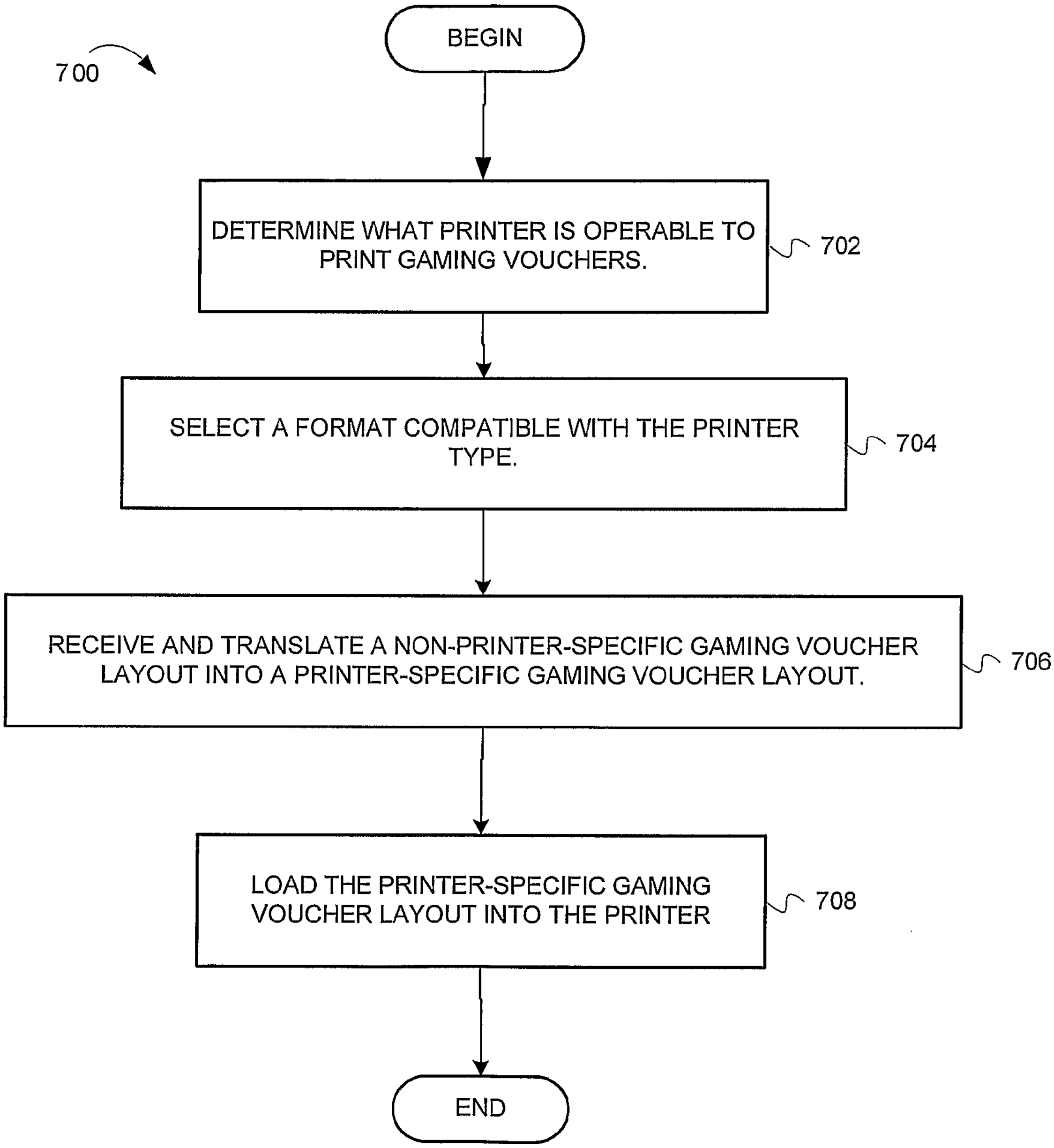
FIG. 7 is a flow diagram illustrating operations for loading a gaming voucher layout onto a printer, according to example embodiments of the invention.
Figure 8:
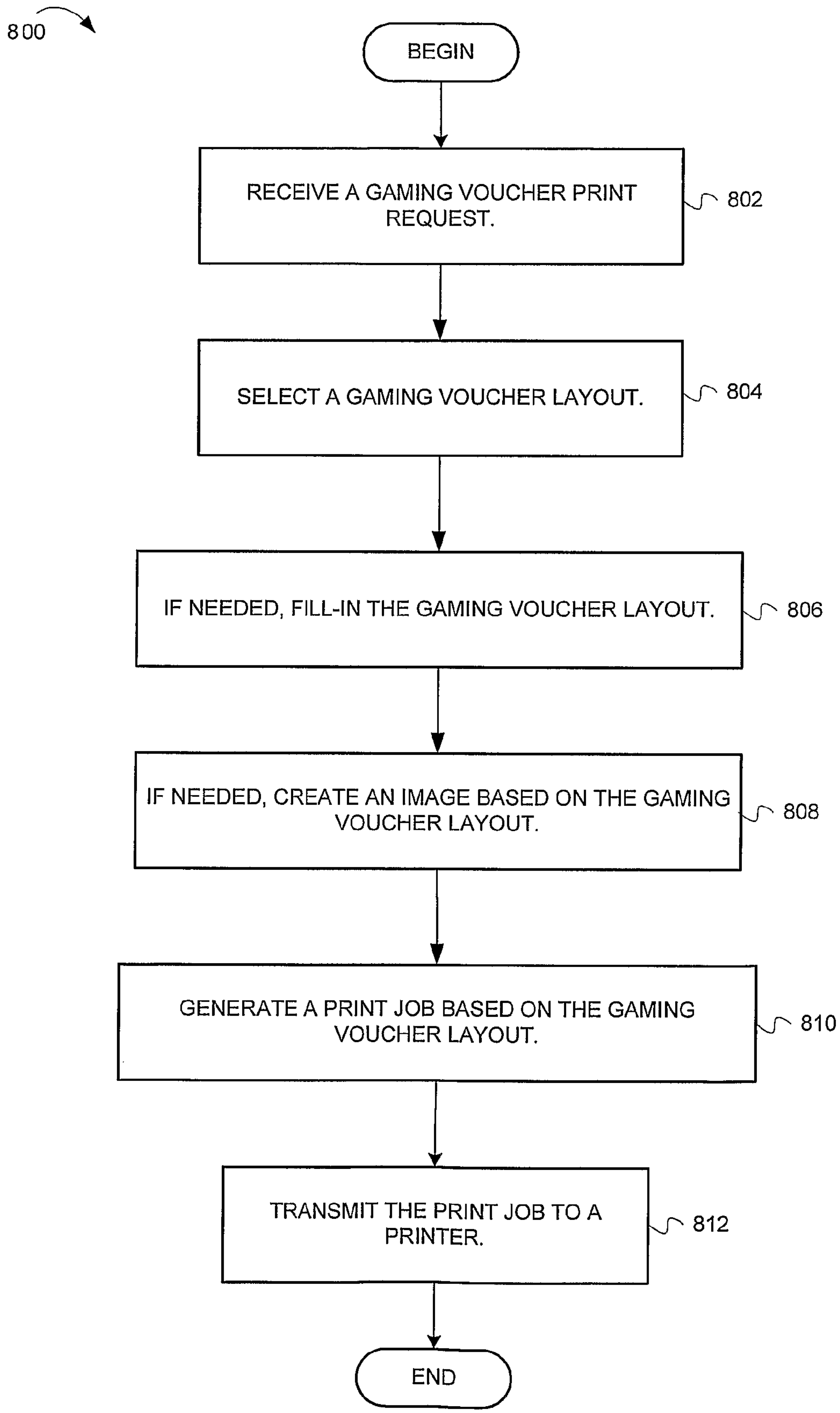
FIG. 8 is a flow diagram illustrating operations for using gaming voucher layouts for printing gaming vouchers, according to example embodiments of the invention.

FIGS. 5-8 are discussed below. FIGS. 5 and 6 describe operations and tools for creating gaming voucher layouts, while FIG. 7 describes operations for translating gaming voucher layouts. FIG. 8 describes operations for printing a gaming voucher using a gaming voucher layout. This description proceeds with FIG. 5.

FIG. 5 is a flow diagram illustrating operations for creating a gaming voucher layout, according to example embodiments of the invention. The flow diagram 500 commences at block 502. In some embodiments, the operations of the flow 500 can be performed by gaming machine components (e.g., gaming machine voucher layout generator 234), while in other embodiments, the operations are performed by network devices, such as the game server 320.

At block 502, a gaming voucher layout design interface is presented. For example, the gaming server's gaming voucher layout generator 334 presents a gaming voucher layout design interface in which operators can graphically design gaming voucher layouts in a gaming machine on the casino floor. FIG. 6 describes embodiments of a gaming voucher layout generator in more detail.

FIG. 6 is a block diagram illustrating a gaming voucher layout design interface, according to example embodiments of the invention. As shown in FIG. 6, gaming voucher layout design interface 600 includes a layout window 610 and an elements window 606. In one embodiment, an operator can drag and drop elements 602 from the elements window 606 into the layout window 610. For example, an operator can drag and drop a bar-code element 604 into a gaming voucher layout 608.

In one embodiment the gaming voucher layout design interface 600 can design gaming voucher layouts for specific jurisdictions. When designing for a specific jurisdiction, the gaming voucher layout design interface 600 may require certain elements and/or attributes, while prohibiting others. For example, the gaming voucher layout design interface 600 may require a Nevada voucher's bar code element to be at a particular location, while prohibiting barcodes for New Jersey vouchers.

In one embodiment, the gaming voucher layout design interface includes a gaming voucher layout wizard (not shown) for designing gaming voucher layouts. In one embodiment, the layout wizard receives a series of user selections with which it creates a gaming voucher layout.

Referring back to FIG. 5, the flow continues at block 504.

At block 504, information for defining a gaming voucher layout is received. For example, in one embodiment, the gaming voucher layout generator 334 receives a set of elements and element attributes through the gaming voucher layout design interface 600. The flow continues at block 506.

At block 506, a gaming voucher layout is created based on the information. For example, the gaming voucher layout generator 334 creates a gaming voucher layout based on the elements and element attributes received through its gaming voucher layout design interface 600. In one embodiment, the gaming voucher layout is in a printer-non-specific format, such as a printer-non-specific page description language. The flow continues at block 508.

At block 508, the gaming voucher layout is stored. For example, the gaming voucher layout generator 334 stores the gaming voucher layout in the gaming machine 206 or on the gaming network's gaming voucher layout store 316. In one embodiment, the gaming voucher layout is stored as a database record in the gaming voucher layout store 316. From block 508, the flow ends.

While FIGS. 5 and 6 describe creating gaming voucher layouts, FIG. 7 describes loading gaming voucher layouts onto a printer. This description continues with FIG. 7.

FIG. 7 is a flow diagram illustrating operations for loading a gaming voucher layout onto a printer, according to example embodiments of the invention. In one embodiment, a gaming machine performs these operations for loading a gaming voucher layout onto a printer when it boots-up, whereas other embodiments perform these operations at other times. The flow 700 commences at block 702.

At block 702, a determination is made about what type of printer is operable for printing gaming vouchers. For example, at boot-up, the gaming voucher translator 232 queries the gaming voucher printer 222 to determine its type (e.g., make, model, etc.). The flow continues at block 704.

At block 704, a data format compatible with the printer type is selected. For example, the gaming voucher translator 232 selects a page description language understood by the gaming voucher printer 222. The flow continues at block 706.

At block 706, a printer-non-specific gaming voucher template is received and translated into a printer-specific gaming voucher template. For example, the gaming voucher translator 232 requests and receives a gaming voucher layout from the gaming voucher layout store 316. The gaming voucher translator 232 then translates the gaming voucher layout into a printer-specific gaming voucher layout. In one embodiment, the voucher translator 232 translates the gaming voucher layout from a printer-non-specific page description language into a page description language understood by the voucher printer 222. The flow continues at block 708.

At block 708, the printer-specific gaming voucher layout is loaded onto a voucher printer. For example, the gaming voucher translator 232 loads the printer-specific gaming voucher layout into the gaming voucher printer 222. In one embodiment, after the gaming voucher printer 222 receives the printer-specific gaming voucher layout, it can receive and print data according to the layout. From block 708, the flow ends.

Although FIG. 7 describes processing a single gaming voucher layout, other embodiments can translate and load additional gaming voucher layouts onto a printer. As a result, embodiments of the gaming voucher print service 236 can select between a plurality of gaming voucher layouts. For example, the gaming voucher print service 236 can select between a jackpot voucher layout, cash-out voucher layout, jackpot receipt layout, and inventory receipt layout. In one embodiment, the gaming voucher print service 236 uses layout identifiers for indicating which of the layouts should be used for printing gaming vouchers. Operations for printing gaming vouchers are described below, in the discussion of FIG. 8.

FIG. 8 is a flow diagram illustrating operations for using gaming voucher layouts for printing gaming vouchers, according to example embodiments of the invention. The flow 800 commences at block 802.

At block 802, a gaming voucher print request is received. For example, the gaming voucher print service 236 receives a gaming voucher print request, resulting from a player cash-out, jackpot award, or other event. In one embodiment, the gaming voucher print request indicates what event caused the print request. The flow continues at block 804.

At block 804, a gaming voucher layout is selected. For example, the gaming voucher print service 236 selects which of a plurality of print layouts it will use for servicing the print request received at block 802. In one embodiment, the gaming voucher print service 236 makes the selection based on event information included in the print request. The flow continues at block 806.

At block 806, the selected gaming voucher layout is filled-in, if needed. In one embodiment, some voucher elements are preconfigured with default values, while other elements are dynamically configurable. For example, the gaming voucher print service 236 may dynamically insert text representing a voucher's dollar value into the voucher's dollar value element 402, whereas it uses default values for the voucher's message elements 408 and 410. The flow continues at block 808.

At block 808, if needed, an image is created based on the gaming voucher layout. For example, the gaming voucher print service 236 creates an image based on the gaming voucher layout and other data (e.g., cash-out amount, jackpot amount, etc.). In one embodiment, the gaming voucher print service 236 uses the image to populate the gaming voucher layout's image element. The image element may be gaming voucher layout's only element. The flow continues at bock 810.

At block 810, a print job based on the gaming voucher layout is generated. For example, the gaming voucher print service 236 creates a print job based on the filled-in gaming voucher layout. In one embodiment, the print job includes an identifier indicating that the print job is based on a particular gaming voucher layout. Therefore, the printer can determine that a given print job is based on a particular gaming voucher layout. The flow continues at block 812.

At block 812, the print job is transmitted to the printer. For example, the gaming voucher print service 236 transmits the print job to the gaming voucher printer 222. In one embodiment, the gaming voucher printer 222 prints a gaming voucher in response to receiving a print job. From block 812, the flow ends.

The next section describes example embodiments of a gaming machine.

Example Gaming Machine

This section describes features of a gaming machine which can be used with embodiments of the invention.

Figure 9:
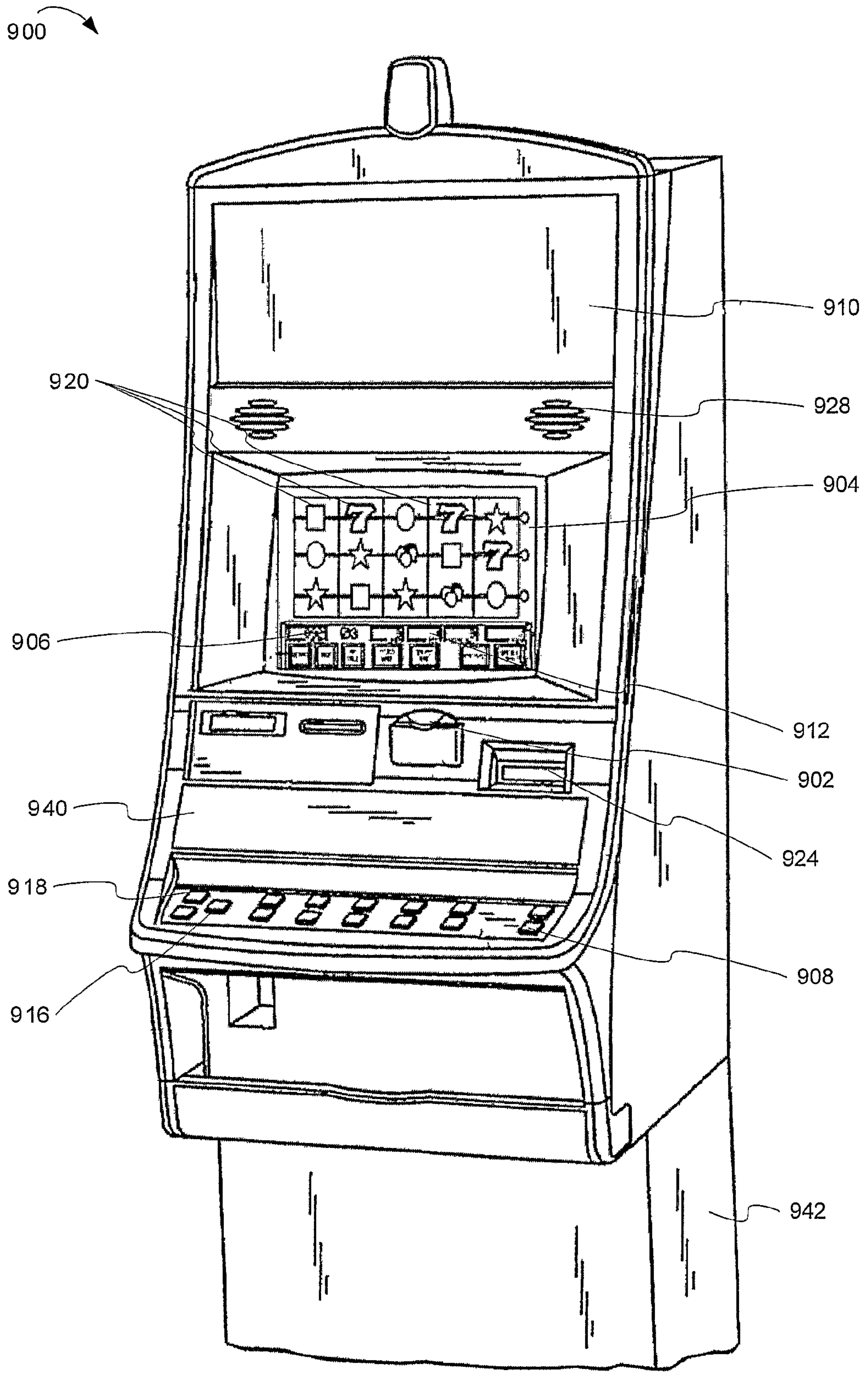
FIG. 9 is a perspective view of a gaming machine, according to example embodiments of the invention.

FIG. 9 is a perspective view of a gaming machine, according to example embodiments of the invention. As shown in FIG. 9, the gaming machine 900 can be a computerized slot machine having the controls, displays, and features of a conventional slot machine.

The gaming machine 900 can be mounted on a stand 942 or it can be constructed as a pub-style tabletop game (not shown). As a result, the gaming machine 900 can be operated while players are standing or seated. Furthermore, the gaming machine 900 can be constructed with varying cabinet and display designs. The gaming machine 900 can incorporate any primary game such as slots, poker, or keno, and additional bonus round games. The symbols and indicia used on and in the gaming machine 900 can take mechanical, electrical, or video form.

As illustrated in FIG. 9, the gaming machine 900 includes a coin slot 902 and bill acceptor 924. Players can place coins in the coin slot 902 and paper money or ticket vouchers in the bill acceptor 924. Other devices can be used for accepting payment. For example, credit/debit card readers/validators can be used for accepting payment. Additionally, the gaming machine 900 can perform electronic funds transfers and financial transfers to procure monies from financial accounts. When a player inserts money in the gaming machine 900, a number of credits corresponding to the amount deposited are shown in a credit display 906. After depositing the appropriate amount of money, a player can begin playing the game by pushing play button 908. The play button 908 can be any play activator used for starting a wagering game or sequence of events in the gaming machine 900.

As shown in FIG. 9, the gaming machine 900 also includes a bet display 912 and one or more "bet" buttons on the panel 916. The player can place a bet by pushing one or more of the bet buttons on the panel 916. The player can increase the bet by one or more credits each time the player pushes a bet button. When the player pushes a "bet one" button 916, the number of credits shown in the credit display 906 decreases by one credit, while the number of credits shown in the bet display 912 increases by one credit.

A player may end the gaming session or "cash-out" by pressing a cash-out button 918. When a player cashes-out, the gaming machine 900 dispenses a voucher or currency corresponding to the number of remaining credits. The gaming machine 900 may employ other payout mechanisms such as credit slips (which are redeemable by a cashier) or electronically recordable cards (which track player credits), or electronic funds transfer.

The gaming machine also includes a primary display unit 904 and a secondary display unit 910 (also known as a "top box"). The gaming machine may also include an auxiliary video display 940. In one embodiment, the primary display unit 904 displays a plurality of video reels 920. According to embodiments of the invention, the display units 904 and 910 can include any visual representation or exhibition, including moving physical objects (e.g., mechanical reels and wheels), dynamic lighting, and video images. In one embodiment, each reel 920 includes a plurality of symbols such as bells, hearts, fruits, numbers, letters, bars or other images, which correspond to a theme associated with the gaming machine 900. Additionally, the gaming machine 900 also includes an audio presentation unit 928. The audio presentation unit 928 can include audio speakers or other suitable sound projection devices.

In one embodiment, the gaming machine 900 includes components for creating gaming voucher layouts on a casino floor, as described herein.

General

In this description, numerous specific details are set forth. However, it is understood that embodiments of the invention may be practiced without these specific details. In other instances, well-known circuits, structures and techniques have not been shown in detail in order not to obscure the understanding of this description. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein. Each claim, as may be amended, constitutes an embodiment of the invention, incorporated by reference into the detailed description. Moreover, in this description, the phrase "example embodiment" means that the embodiment being referred to serves as an example or illustration.

Herein, block diagrams illustrate example embodiments of the invention. Also herein, flow diagrams illustrate operations of the example embodiments of the invention. The operations of the flow diagrams are described with reference to the example embodiments shown in the block diagrams. However, it should be understood that the operations of the flow diagrams could be performed by embodiments of the invention other than those discussed with reference to the block diagrams, and embodiments discussed with references to the block diagrams could perform operations different than those discussed with reference to the flow diagrams. Additionally, some embodiments may not perform all the operations shown in a flow diagram. Moreover, although the flow diagrams depict serial operations, certain embodiments could perform certain of those operations in parallel.

The invention claimed is:

1. A computer-implemented method of designing a customized gaming voucher, the gaming voucher being printable at a gaming machine configured to conduct a wagering game and to print vouchers of player credits, the method comprising:

displaying, on a display device, a gaming voucher graphic design interface, the graphic design interface displaying one or more exemplary gaming voucher layout options and definable information elements;

receiving, from an operator via at least one input device, layout information that creates a gaming voucher layout, the layout information comprising selections from the one or more exemplary gaming voucher layout options as well as defined information elements;

generating and displaying, via one or more processors and the display device, the gaming voucher layout based on the selected and defined layout information; and in response to further operator input, storing, in at least one memory device, the generated gaming voucher layout.

2. The method of claim 1, further comprising translating the gaming voucher layout into a page description language understandable by a printer.

3. The method of claim 1, wherein the gaming voucher layout options include at least one of a font, font size, ink color, and data field.

4. The method of claim 1, further comprising loading the gaming voucher layout into a printer and printing the gaming voucher according to the gaming voucher layout.

5. The method of claim 1, wherein the gaming voucher layout is of a jackpot voucher, cash-out voucher, jackpot receipt, or inventory receipt.

6. The method of claim 1, wherein the one or more exemplary gaming voucher layout options are downloaded from one or more servers via a communications network, and wherein the generated gaming voucher layout is stored on at least one of the one or more servers.

7. A computer-implemented method of designing a customized gaming voucher, the gaming voucher being printable at a gaming machine configured to conduct a wagering game and to print vouchers of player credits, the method comprising:

presenting, on a display device, a gaming voucher layout graphic design interface, the design interface displaying one or more exemplary gaming voucher layout options including voucher elements and element attributes;

receiving, from an operator through the gaming voucher layout graphic design interface, gaming voucher selections specifying elements of the a gaming voucher, the selections including at least one of a monetary value element, a validation information element, a bar-code element, and a message element; and creating, based at least in part on the received gaming voucher selections, a gaming voucher layout and storing the gaming voucher layout in a memory device.

8. The method of claim further comprising restricting the gaming voucher selections, via the gaming voucher layout design interface, to certain exemplary voucher options, elements and element attributes, the restricting based at least in part on laws of a regulatory jurisdiction.

9. The method of claim 7, further comprising requiring, via the gaming voucher layout design interface, certain exemplary voucher options, elements and element attributes, the requiring based at least in part on laws of a regulatory jurisdiction.

10. The method of claim 7, further comprising: translating the gaming voucher layout into a format understandable by a gaming voucher printer, wherein the gaming voucher printer is part of the gaming machine, and loading the gaming voucher layout onto the gaming voucher printer.

11. The method of claim 7, wherein the displaying includes determining a jurisdiction in which the gaming voucher layout can be used and, based at least in part on the jurisdiction, displaying the gaming voucher layout options that are permissible in the jurisdiction.

12. The method of claim 7, further comprising determining that the generated gaming voucher layout conforms to laws of a designated regulatory jurisdiction.

13. The method of claim 7, wherein the generated gaming voucher layout is in a printer-non-specific format.

14. The method of claim 7, wherein the generated gaming voucher layout is in a page description language understandable to a gaming voucher printer.

15. The method of claim 7, wherein the gaming voucher layout design interface provides drag and drop elements for selecting the gaming voucher elements.

16. A computer-implemented method of designing a customized gaming voucher, the gaming voucher being printable at a gaming machine configured to conduct a wagering game and to print vouchers of player credits, the method comprising:

displaying, on a display device, a gaming voucher graphic design interface, the graphic design interface displaying one or more exemplary gaming voucher layout options and definable information elements;

receiving, from an operator via at least one input device, a selection of a first gaming voucher layout, the first gaming voucher layout including selectable information elements, the first gaming voucher layout being downloaded from a voucher layout store;

receiving, from the operator, modifications to the selectable information elements;

storing the modified first gaming voucher layout in a memory device;

selecting a gaming voucher layout format compatible with a gaming voucher printer of the gaming machine;

translating, based on the gaming voucher layout format, the modified first gaming voucher layout into a second gaming voucher layout; and loading the second gaming voucher layout onto the gaming voucher printer.

17. The method of claim 16, wherein the method is performed during boot-up.

18. The method of claim 16, wherein the first gaming voucher layout is received from a database on a gaming network.

19. The method of claim 16, wherein the second gaming voucher layout is represented in a page description language compatible with the gaming voucher printer.

20. The method of claim 16, wherein the first gaming voucher layout is represented in a page description language that is not compatible with the gaming voucher printer.

* * * * *

UNITED STATES PATENT AND TRADEMARK OFFICE

CERTIFICATE OF CORRECTION

PATENT NO. : 8,169,653 B2
APPLICATION NO. : 11/997572
DATED : May 1, 2012
INVENTOR(S) : Jacek A. Grabiec et al.

It is certified that error appears in the above-identified patent and that said Letters Patent is hereby corrected as shown below:

In column 10, line 44, in Claim 7, after “of the” delete “a”.

In column 10, line 51, in Claim 8, delete “claim” and insert -- claim 7, --, therefor.

In column 10, line 61, in Claim 10, delete “comprising:” and insert -- comprising --, therefor.

Signed and Sealed this
Fourteenth Day of August, 2012

David J. Kappos
*Director of the United States Patent and Trademark Office*